United States Patent [19]

Sun et al.

[11] Patent Number: 5,059,475
[45] Date of Patent: Oct. 22, 1991

[54] APPARATUS AND METHOD OF FORMING OPTICAL WAVEGUIDES ON METALIZED SUBSTRATES

[75] Inventors: Cheng-ko J. Sun; Shigeki Sakaguchi, both of Worthington; Tadashi Miyashita, Upper Arlington, all of Ohio

[73] Assignee: Photonic Integration Research, Inc., Columbus, Ohio

[21] Appl. No.: 545,874

[22] Filed: Jun. 29, 1990

[51] Int. Cl.$^5$ .............................................. B32B 9/00
[52] U.S. Cl. .................................... 428/195; 428/209; 428/411.1; 428/426; 428/432; 428/446; 428/447; 428/901; 65/3.12; 385/14; 385/130
[58] Field of Search ....................... 428/195, 209, 411.1, 428/426, 432, 446, 447, 901; 65/3.12; 350/96.12, 96.14, 96.33

[56] References Cited

U.S. PATENT DOCUMENTS

| | | | |
|---|---|---|---|
| 3,873,339 | 3/1975 | Hudson | 65/18.2 |
| 3,933,454 | 1/1976 | DeLuca | 65/3.12 |
| 3,934,061 | 1/1976 | Keck et al. | 65/60.2 |
| 4,125,388 | 11/1978 | Powers | 65/3.12 |
| 4,157,906 | 6/1979 | Bailey | 65/30.1 |
| 4,203,744 | 5/1980 | Schultz et al. | 65/3 |
| 4,236,930 | 12/1980 | Macedo et al. | 106/54 |
| 4,263,031 | 4/1981 | Schultz | 65/3.12 |
| 4,298,365 | 11/1981 | Bailey et al. | 65/3.12 |
| 4,453,961 | 6/1984 | Berkey | 65/3.12 |
| 4,486,212 | 12/1984 | Berkey | 65/3.12 |
| 4,664,473 | 5/1987 | Gannon | 350/96.33 |
| 4,695,122 | 9/1987 | Ishida et al. | 350/96.12 |
| 4,701,008 | 10/1987 | Richard et al. | 156/657 |
| 4,705,346 | 11/1987 | Miyawaki | 350/96.14 |
| 4,729,618 | 3/1988 | Yoshida et al. | 350/96.11 |
| 4,762,382 | 8/1988 | Husain et al. | 350/96.12 |

OTHER PUBLICATIONS

"Optical Interconnections for Massively Parallel Architectures", Applied Optics, vol. 29, No. 8, Mar. 10, 1990, pp. 1077-1093, by Aloke Guha, et al.

"Optical Interconnections for VLSI Systems", Proceedings of the IEEE, vol. 72, No. 7, Jul. 1984, by Joseph W. Goodman, et al.

"Optical Interconnects Replace Hardwire", IEEE Spectrum, Mar. 1987, by Lynn D. Hutcheson, et al.

"Flame Hydrolysis Deposition of $SiO_2$-$TiO_2$ Glass Planar Optical Waveguides on Silicon", Japan Journal of Applied Physics, vol. 22, No. 12, 1983 by Masao Kawachi, et al.

"Fabrication of $SiO_2$-$TiO_2$ Glass Planar Optical Waveguides by Flame Hydrolysis Deposition", Electronic Letters, vol. 19, No. 15, pp. 583-584, Jul. 1983, by M. Kawachi, et al.

"Stress Measurements of Thermally Grown Thin Oxides on Si Substrates", Journal of Electrochemical Society, vol. 136, No. 11, Nov. 1989, by L. M. Mack, et al.

"Handbook of Glass Properties", 1986, by Narattam P. Bansal and R. H. Doremus, p. 363.

*Primary Examiner*—Patrick J. Ryan
*Attorney, Agent, or Firm*—Porter, Wright Morris & Arthur

[57] ABSTRACT

An integrated optoelectrical circuit is described. An apparatus and method are disclosed whereby planar optical waveguides are formed on $Al_2O_3$, other ceramics, silicon, silica, and other glass substrates that are thin film wired. An interface coating of silicon or silicon dioxide is applied to a surface of the thin film wired substrates using a low temperature deposition process such as sputtering or chemical vapor deposition. Glass cladding and core layers are deposited onto the thin film coating using a flame hydrolysis deposition technique. With this invention, channel waveguides and integrated optical circuits can be formed on a common substrate with electronic IC chips.

10 Claims, 1 Drawing Sheet

APPARATUS AND METHOD OF FORMING OPTICAL WAVEGUIDES ON METALIZED SUBSTRATES

FIELD OF THE INVENTION

This invention relates to electro-optical circuitry, and more particularly to optical waveguides and methods for forming optical waveguides on thin film or thick film wired or metalized $Al_2O_3$, silicon and, other ceramics and glass based substrates bearing an integrated circuit.

BACKGROUND AND SUMMARY OF THE INVENTION

The general object of this invention is to permit the fabrication of an integrated optical circuit upon a substrate that includes a conventional thin-film or thick film electrical circuit including familiar integrated circuit (IC) chip devices. In the invention, a combination of electronic and optical circuits may be fabricated upon a same, common substrate.

The following references are cited to show the state of the art over which the devices and methods disclosed herein are considered an invention: Guha, A., et al. "Optical interconnections for massively parallel architectures" Appl. Optics, Volume 29, pp. 1077-1093, 1990; Goodman, J. W., et al. "Optical Interconnections for VLSI Systems", Proc. IEEE, Vol. 72, pp. 850-866, 1984; Hutcheson L. D. et al. "Optical Interconnects Replace Hard Wire", IEEE Spectrum, Vol. 24, 3 pp. 30-35, 1987; Kawachi, M., et al. "Flame Hydrolysis Deposition of $SiO_2$-$TiO_2$ Glass Planar Optical Waveguides on Silicon"Jpn. J. Appl. Phys. Vol. 22, pp. 1932, 1983; Kawachi, M., et al. "Fabrication of $SiO_2$ Glass Planar Optical Waveguides by Flame Hydrolysis Deposition", Electronics Letters, Vol. 19, 15 pp. 583-584, 1983; Mack, L. M. and Reisman, A., "Stress Measurements of Thermally Grown Thin Oxides on (100) S; Substrates", J. Electrochem. Soc. Vol. 136, No. 11, pp. 3433-3437, 1989; and, Bansal, N. and Doremus, R., Handbook of Glass Properties, Ch. 12, p. 363, 1986.

Flame hydrolysis deposition ("FHD"), a process which involves the deposit of powdered glass on a substrate and its subsequent fusion or consolidation into a solid glass at high temperatures, has been used to deposit waveguides for optical signal transmission on silicon and silica substrates. Such substrates, however, have not included thin film electrical circuits over which an FHD produced waveguide layer has been deposited. Other deposition methods such as chemical vapor deposition ("CVD") and sputtering have been used to form planar waveguides on substrates of silicon and silica. These latter methods have also not been used to deposit optical waveguides onto metalized $Al_2O_3$ ceramic substrates or metalized silicon or silica substrates.

The device and method of the present invention involve the formation of optical waveguides on thin film or thick film wired, or metalized, $Al_2O_3$, ceramic, silicon and silica substrates by using FHD techniques. In the present invention, a pretreatment coating is applied to the surface of the IC bearing substrate that includes thin or thick film wired, or metalized circuitry interconnecting IC chips. The pretreatment provides an interface between the metalized substrate which contains electrical circuits and the FHD glass layer which contains optical circuitry.

Thus, the purpose of the invention is to form optical waveguides on metalized substrates. In accordance, with this invention, optical waveguides and integrated optical circuits can be formed on a common substrate with IC chips to enable the integration of optical integrated circuits and electronic integrated circuits on the same component. A substrate may hold several IC chips between which thin or thick film wires provide signal transmission and electrical power. And optical circuitry in a glass layer superimposed over the substrate may similarly be operatively interconnected with the electronic circuitry. With this invention, the channel waveguides and integrated optical circuits can be formed in the glass layer, usually by known lithography and etching techniques. The waveguides of the present invention provide the optical interconnects which have been recently recognized as a promising solution to electrical interconnection bottlenecks in high speed electronics. The interconnection of optical circuitry and electrical circuitry is explained in greater detail in the Hutcheson article cited above which is incorporated by reference herein.

The optoelectronic chips that function with light received from a waveguide and correspondingly convert a light signal into an electronic signal, and vice versa, are known and electronic/optical converters are commercially available. The invention "integrates" an electronic integrated circuit with an optical integrated circuit on the same substrate unit as a single circuit module. Additional benefits of optical interconnections between electronic integrated circuits include immunity to electro-magnetic interference ("EMI") and the capability of various integrated optical circuits such as combiner/splitters, couplers, electro-optical circuits and non-linear optical circuits made from planar waveguides to be integrated with electronic integrated circuits on the same substrate.

With this invention, optical waveguides and circuits can be formed on thin film or thick film metalized, $Al_2O_3$ ceramic and silicon and silica substrates. Because, $Al_2O_3$ can withstand much higher process temperatures (up to 1600° C.) than silicon or silica, the use of $Al_2O_3$ ceramics permits higher process temperature in the deposition of the waveguide layer on the substrate. thus, an optical waveguide having a lower loss characteristic that is produced in a high temperature process can be deployed on a substrate including thin film or thick film metalized electrical interconnections.

In microelectronic device fabrication, in which IC chips are placed on metalized substrates to form a multi-chip circuit, the integrated optical circuits provided by the invention can be fabricated on the same substrate holding the multiple electronic IC chips. The invention is useful in making such opto-electronic devices for communication and computer industries.

In the present invention, a thin-film coating either silicon dioxide ($SiO_2$) or silicon, is deposited onto the surface of a metalized substrate that may contain IC chips to (i) provide better adhesion of the subsequently deposited waveguide glass layer, (ii) prevent impurities in the substrate from adversely affecting the high purity glass used to form the waveguides during the deposition processes, and (iii) protect the metal film on the substrate from oxidization caused by oxygen penetration through the porous substrates and glass film. The thin-film coating between the substrate and the waveguides layer may be applied by sputtering, chemical vapor deposition (CVD), or other low temperature coating process. FHD is then used to deposit a glass layer on the pretreated substrate upon which the waveguides for the optical circuit are formed.

The foregoing and other objects and advantages of the invention will become more apparent when considered in view of the accompanying drawings and the following descriptions:

DESCRIPTION OF THE PREFERRED EMBODIMENT(S)

Figure 1:
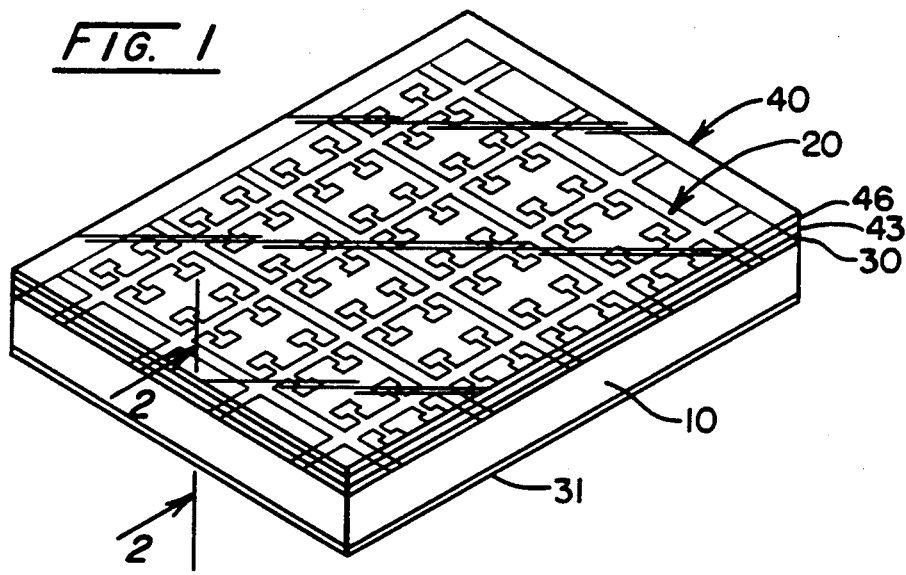
FIG. 1 is a perspective view of a planar waveguide of the present invention applied to a metalized substrate having a plurality of electrical integrated circuits thereon.

Referring to the drawings, there is illustrated in FIG. 1 a substrate 10 having metal wiring 20 thereon operatively interconnected to a planar waveguide formed by glass layer 40. The thin film wiring 20 is shown as it may appear on the substrate 10. In a typical configuration of an optoelectronic circuit, an IC chip (not shown) is in contact with thin film or thick film metalized "wires" 20 that operatively interconnect signal and power sources between chips. A signal otherwise processed by the electronic chip is converted into an optical signal that is transmitted in a waveguide to a next signal processing component. The optical waveguide circuitry and the electronic components are usually operatively interrelated with precision and in close proximity in a combined optoelectronic circuit.

Figure 2:
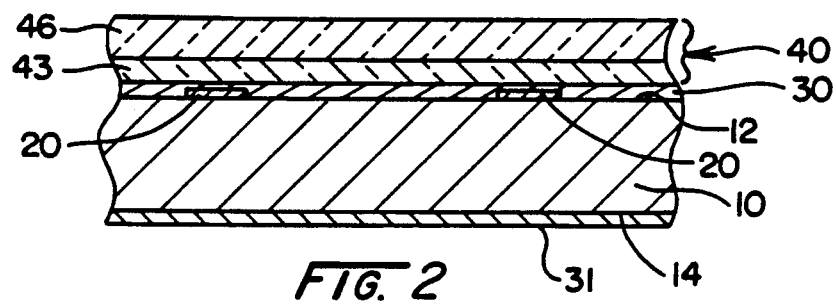
FIG. 2 is an enlarged view of Section 2—2 of FIG. 1.

Referring to FIG. 2, a transverse cross section of FIG. 1 is shown. A thin film 30 of silicon or silicon dioxide (SiO₂), preferably 1-5 microns thick, is applied to the substrate 10 to pretreat the wired electronically operative surface 12 of the substrate 10 that may later include IC chips. The coating 30 can be applied using sputtering, CVD or any other low temperature deposition process as long as the application of the coating 30 does not cause the wires 20 on surface 12 of the substrate 10 to melt or oxidize. Techniques employed in such processes are known to those of skill in the coating process art.

FHD is then used to deposit a double layer 40 of a glass material that may later include optical circuitry onto the substrate 10. This double glass layer 40 includes a waveguide cladding layer 43. The cladding glass layer 43 should be formulated to have a large thermal expansion coefficient (greater than $2 \times 10^{-6}$ when $Al_2O_3$ is used as the substrate material) so that the thermal stress in the glass film will be below the glass fracture strength, which is on the order of $10^{10} - 10^{11}$ dyne/cm². A waveguide core layer 46 is then deposited over the cladding layer 43. The core layer 46 may be deposited using the same FHD methods used to apply the cladding layer 43.

An optical waveguide cuircuit may be provided on the substrate 10 by performing lithography and etching techniques on the double glass layer 40 to form channel waveguides (not shown). The channel waveguides may be operatively connected to an electrical integrated circuit on a first planar surface 12.

Useful substrate 10 materials may be selected from the group of ceramic, glass, $Al_2O_3$, silica, and silicon materials and the thin film coating 30 may be selected from the group of silicon and silicon dioxide ($SiO_2$) materials. Of the two component glass layers 43, 46 forming the waveguide, the cladding layer 43 should preferably have a thermal expansion coefficient of at at least $2.0 \times 10^{-6}$ and the core layer 46 a thermal expansion coefficient preferably of at least $2.0 \times 10^{-6}$ when the substrate 10 material is $Al_2O_3$. A further thin film coating layer 31 may be applied to other planar surfaces of the substrate 10. Usually the other surface to coat is the planar side 14 obverse to the first planar surface 12, if the substrate 10 is a porous material, or otherwise permeable, to seal the complete opto-electro assembly thereby preventing oxygen penetration.

In the present invention, the thin film coating 30 reduces the thermal expansion difference between the substrate 10 and the cladding layer 43 and prevents impurities in the substrate 10 from attacking the FHD glass layers 43,46 during the high temperature FHD process. The coating 30 also protects the metalized circuitry 20 from oxidation during the FHD process.

Any metals with a melting temperature higher than the FHD consolidation temperature may be used as wiring materials 20 on the substrate 10. Otherwise, wiring materials 20 will be limited to inert metals such as platinum, rhodium, and the like. The thin film protection coating technique can also be applied to silicon-LSI technology to prevent wiring materials from oxidizing.

The following experimental results are presented to further explain the invention but should not be construed in any way to limit the scope of the invention to the quantities of materials used:

EXAMPLE I

One micron thick $S_iO_2$ was sputtered on metal wired ceramic and silicon substrates similar to the metal pattern shown in FIG. 1. The metallurgy of the wires was 10% titanium and 90% tungsten. The wire thickness was between 1000Å and 3000Å. After sputtering the coating, the FHD process was applied to deposit a cladding and a core layer onto the substrate. The deposited substrates were then consolidated at a temperature of approximately 1200° C. to vitrify the glass films. The cladding was 60 microns and the core layer was 20 microns thick after the consolidation. The cladding was silica ($S_iO_2$) 88% mole percentage doped with boron oxide ($B_2O_3$) 11% and phosphorous oxide ($P_2O_5$) 1%, whose thermal expansion coefficient is $2.0 \times 10^{-6}$. The core was silica ($S_iO_2$) 80% doped with geranium dioxide ($GeO_2$) 11% in addition to $B_2O_3$ 8.5% and $P_2O_5$ 0.5%. The refractive index of the core was 1% higher than that of the cladding and the thermal expansion coefficient of the core was $2.5 \times 10^{-6}$. The waveguides showed good light guiding characteristics after the consolidation and the waveguides adhered to the substrates (both silicon and $Al_2O_3$ ceramics) very well. Metal wiring on the substrate was not affected, because of the protective sputtered $S_iO_2$ film. The sputtered film was applied on both surfaces of the ceramic substrate because of the porous nature of ceramics. The thermal stress of the FHD glass on silicon substrates and ceramic substrates was $0.5 \times 10^9$ and $4 \times 10^9$ dyne/cm², respectively, which were estimated.

The thermal stress in FHD glass for both cases was far below the glass fracture strength $10^{10}$-$10^{11}$ dyne/cm².

While it will be apparent that the preferred embodiments of the invention disclosed herein to provide the advantages and features above stated, it will be appreciated that the invention is susceptible to modification, variation and change without departing from the proper scope or fair meaning of the claims that are set out below.

What is claimed is:

1. An optical-electrical device, comprising: a substrate selected from the group consisting of ceramics, glass, and silicon materials including electrically operative integrated circuits connected by metalized thin film connectors on a first planar surface thereof;

a thin film coating selected from the group consisting of silicon and silicon dioxide ($SiO_2$) materials applied onto said planar surface including the electrically operative integrated circuits;

an optically conductive waveguide formed from a glass cladding layer applied onto said thin film coating and a glass core layer applied to said cladding layer;

whereby the electrically operative integrated circuits are operationally interconnected to the optically conductive waveguides.

2. The device of claim 1, wherein said thin film coating applied to said first planar surface is between 1 and 5 microns thick.

3. The device of claim 1, further comprising a thin film coating applied to a second planar surface of said substrate opposite said first planar surface.

4. The device of claim 1, wherein said ceramic material substrate is $Al_2O_3$.

5. the device of claim, wherein said glass substrate is silica glass.

6. A method for forming an optical waveguide on a metalized substrate said method comprising the steps of:

providing a substrate selected from a member of the group consisting of ceramics, glass, and silicon, having a film of metalized wires therein;

applying a thin film coating layer selected from a member of the group consisting of silicon and silicon dioxide, to said substrate using a low temperature deposition process, said coating layer applied over said wires;

applying a glass cladding layer onto said coating layer; and applying a glass core layer to said cladding layer.

7. The method of claim 6, wherein said ceramic substrate is $Al_2O_3$.

8. The method of claim 6, wherein said glass substrate is silica glass.

9. A device integrating an electronic integrated circuit with an integrated optical circuit, comprising:

a substrate selected from a member of the group consisting of ceramics, glass, and silicon materials, including said electronic circuit operatively interconnected by metallized thin film wires on a first surface thereof;

a coating of silicon dioxide ($SiO_2$) in a thickness of 1 to 5 microns applied to said first surface of said substrate; and a double glass layer including optical circuit waveguides applied to said coating, said double glass layer formed from a first glass cladding layer and a second glass core layer.

10. An integrated opto-electronic circuit comprising thin film metalized circuitry of an electronic circuit formed on a substrate selected from a member of the group consisting of ceramics, glass, and silicon materials, and optical waveguides formed in a glass layer operatively interconnected with said electronic circuitry, are separated by an interface film coating layer selected from at least one of the members of the group consisting of silicon and silicon dioxide materials.

* * * * *